United States Patent [19]
McCurry

[11] Patent Number: 5,513,677
[45] Date of Patent: May 7, 1996

[54] REMOTE FILL RECEPTACLE

[76] Inventor: O. Thomas McCurry, 109 Tea Farm Rd., Summerville, S.C. 29483

[21] Appl. No.: 192,381

[22] Filed: Feb. 7, 1994

[51] Int. Cl.⁶ ..................................................... A47G 7/02
[52] U.S. Cl. ................... 141/1; 141/98; 141/334; 141/337; 141/391; 47/40.5; 47/48.5
[58] Field of Search ............... 141/98, 331, 333, 141/334, 337, 391, 1; 47/79, 40.5, 45.5

[56] References Cited

U.S. PATENT DOCUMENTS

| | | | |
|---|---|---|---|
| 2,938,304 | 5/1960 | Thomas et al. | 47/40.5 X |
| 3,469,342 | 9/1969 | Morris | 47/40.5 X |
| 3,697,026 | 10/1972 | Hambrick | 248/46 |
| 4,060,934 | 12/1977 | Skaggs et al. | 47/79 |
| 4,372,100 | 2/1983 | Miller et al. | 141/105 |
| 4,827,666 | 5/1989 | Tweddell, IV | 47/58 |
| 4,850,137 | 7/1989 | Foster | 47/79 |
| 4,930,252 | 6/1990 | Krause et al. | 47/40.5 |
| 4,997,176 | 2/1991 | Spinosa | 47/40.5 |
| 5,054,236 | 10/1991 | Sands | 47/79 |
| 5,076,009 | 12/1991 | Cibor | 47/40.5 |
| 5,099,872 | 3/1992 | Tarvin et al. | 141/337 X |
| 5,157,868 | 10/1992 | Munoz | 47/40.5 |
| 5,279,071 | 1/1994 | McDougall | 47/40.5 |
| 5,358,000 | 10/1994 | O'Hair | 137/124 |

OTHER PUBLICATIONS

Wordless Workshop *Popular Science* Dec., 1978 p. 140.

*Primary Examiner*—J. Casimer Jacyna
*Assistant Examiner*—Steven O. Douglas

[57] ABSTRACT

A remote fill receptacle device is provided comprising (1) a receptacle body and (2) a receptacle conduit, the device being employed in conjunction with a tree stand including a water reservoir for conveniently filling/refilling the tree stand's water reservoir in the invention process by receiving water additions via an inlet opening in the upper portion of the body and permitting said water to gravity discharge from the body via an outlet opening in the lower portion of the body through the receptacle conduit which directs the discharged water from the outlet opening to the water reservoir.

13 Claims, 2 Drawing Sheets

REMOTE FILL RECEPTACLE

BACKGROUND OF THE INVENTION

1. Field of the Invention

This invention relates to a method and apparatus for filling a fluid container from a location remote from and elevated above the fluid container. In particular, the invention relates to an improved method an apparatus for watering a live tree. More particularly, the invention primarily relates to and improved method and apparatus for watering a live tree removed from the ground and held upright in a tree stand which includes a water reservoir permitting contact with the base of the tree by the water.

2. Description of the Prior Art

Generally, the prior art may address devices and methods for watering vegetation and/or facilitating filling and refilling fluid containers in relation to watering live vegetation. Such prior art devices and methods may range from a common funnel with a larger opening and a narrower exit to assist in delivering a fluid, usually liquid, into a container with a small opening to significantly more complex water storage refill systems, such as taught in U.S. Pat. No. 4,039,001, involving sensing devices to indicate the need for refill which is accomplished by electronically actuated flow control valves.

Although the invention device and method is relatively simple as to the latter teaching, it more appropriately relates to prior art teachings of more sophisticated funnel-like devices, such as the filling device designed for simultaneously filling a tank with two miscible liquids as taught in U.S. Pat. No. 2,902,062 or the dispensing measuring funnel including "measurement indicia discernible in relation to the contents therein" as taught in U.S. Pat. No. 5,228,488. None of these prior art devices or fill (or refill) methods, however, teaches or suggests the invention device and/or method for watering a live tree removed from the ground and held upright in a tree stand which includes a water reservoir employing a fill site located remote from said reservoir.

Therefore, it is the object of this invention to provide an appropriate device for carrying out an improved method for filling and/or refilling a Christmas tree stand water reservoir by introducing the water into a receptacle therefor located at a site remote from the reservoir itself.

SUMMARY OF THE INVENTION

The object of the invention is achieved, as shown in the BRIEF DESCRIPTION OF THE DRAWINGS, by the provision of a remote fill receptacle at a convenient location for filling/refilling the inconveniently located tree stand water reservoir, said receptacle comprising a receptacle body for receiving water additions via an inlet opening and a receptacle conduit attached to the receptacle body's outlet opening to direct the water discharged from the body to the tree stand reservoir. In a preferred embodiment, the conduit is connected to the body via a grommet/connector assembly, and the fluid flow rate into the reservoir is regulated.

DESCRIPTION OF THE PREFERRED EMBODIMENT(S)

While the invention device and method may be employed with respect to the watering of live vegetation either in its natural environment or removed from the ground and set upright in a container for indoor or outdoor maintenance, the invention is particularly suited for maintaining a live Christmas tree in a tree stand with a water reservoir wherein the base of the tree comes in contact with water for its immediate sustenance and preservation. Tree stands for live Christmas trees are of variable design, and they necessarily must include both a means of supporting the tree and a water reservoir of sufficient capacity to facilitate maintenance by limiting the requirement for refill. As a result, such stands, regardless of design, require access to the base of the tree to fill and/or refill the water reservoir for maintaining the tree's freshness, and they rarely add to the decoration and ornamentation of the tree. Usually, the tree stands are considered to detract from the tree's ornamentation and are covered in some decorative fashion, as with a tree skirt. As packages accumulate under the tree on top of the tree skirt, access to the reservoir for monitoring the need for water addition, and for the addition itself, becomes greatly impaired. Each water level check and/or addition usually requires kneeling down to gain access, removing packages, and folding back the tree skirt. After watering, the process must be reversed. The disclosed invention device and method provide a convenient solution to this problem.

Figure 1:
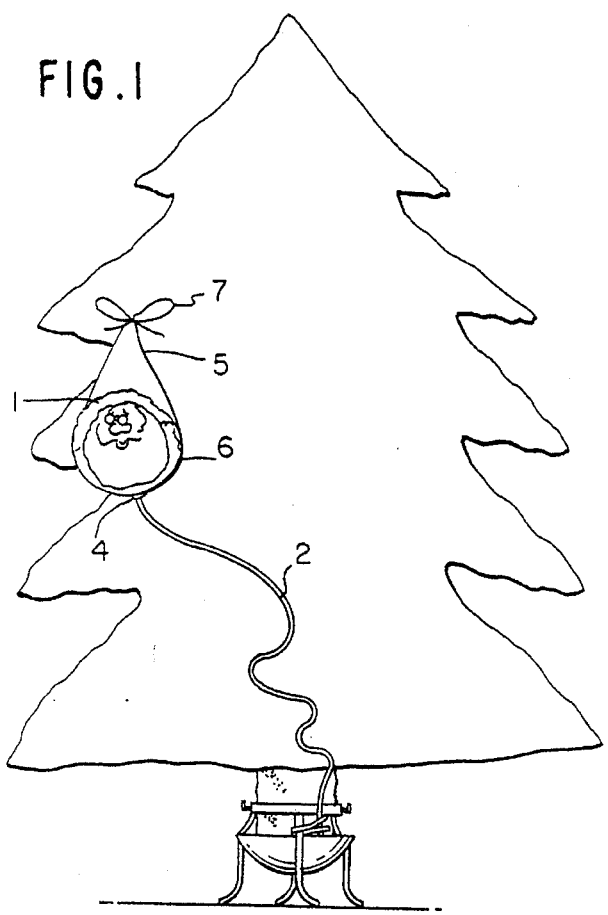
FIG. 1 is a perspective view showing the placement of the invention receptacle device elevated above and remote from the Christmas tree stand water reservoir.

Referring to the drawings, FIG. 1 shows the manner of employment of the remote fill receptacle by attachment of the receptacle body 1 to an upper branch of a live tree removed from the ground and held upright by a tree stand which includes a water reservoir providing water contact with the bottom of the tree. Although, in normal use it would be hidden within the tree branches, a receptacle conduit 2, in the form of a tube or hose, is shown to be attached at one end to the bottom of the body of the receptacle and, at the other end, to be held in a stable position immediately above the tree stand water reservoir.

Figure 2:
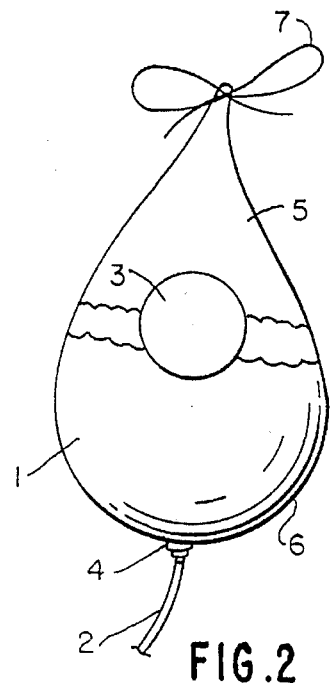
FIG. 2 shows a rear view of the body of the receptacle indicating an inlet opening for introducing the fill/refill water into the body of the receptacle for transport to the tree stand water reservoir.

FIG. 2 shows a rear view of the receptacle body indicating a likely position for an inlet opening 3 through which water is introduced for refilling the tree stand water reservoir. The receptacle body 1 can be of various shapes which provide support for the water before it travels through the conduit 2 to the reservoir. Also, FIG. 2 shows a likely position for a discharge outlet 4 at or near the lowest point in the receptacle body 1 for attachment of the receptacle conduit 2. The material from which the body is formed can be of various sources, both natural and synthetic. Obviously, any material which is not inherently water-proof must be rendered so prior to employing it in the invention method. A likely natural material suitable to the purposes of the invention is a common gourd which conveniently has a bowl-shaped lower portion 6 suitable for supporting a fluid and a narrower neck, or upper portion 5, to which a string, cord, ribbon, or other tying means 7 can be attached for suspending the receptacle body 1 from a tree branch positioned above the tree stand water reservoir. Also, a processed natural material can be used, such as a wax- or plastic-coated paper milk carton of a suitable size, such as a one-pint or half-pint carton. The carton may be painted or decorated for ornamentation. The unfolded spout may be employed as an inlet opening or an inlet opening may be made in one side of the gabled top. Also, the folded ridge of the gabled top can provide a reinforced support for a tying means attachment, and an outlet opening may be conveniently made in the bottom of the carton.

Alternatively, the fill receptacle body 1 may be constructed of a synthetic material, such as plastic. If so constructed, it may be mass produced by injection or other method of molding. Of course, as in the above examples of previously used materials (i.e., post-consumer waste) for natural material based devices, synthetic based receptacle bodies likewise may be formed from suitably sized plastic containers (and, preferably, decorated for ornamentation).

Figure 3:
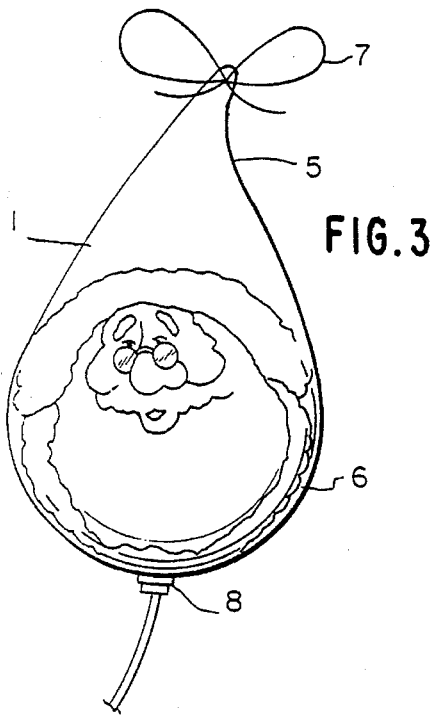
FIG. 3 shows a frontal view of the body of the receptacle, including hanging means at its upper end for attaching the receptacle body to a point of support at its remote location and, at its lower end, specifically at the outlet opening of the body, the attachment thereto of the conduit via a grommet/connector assembly.

In addition to showing a tying means 7 on its upper portion 5 for attaching the receptacle body 1 to a point of support at its location remote from the tree stand water reservoir and, on its lower portion 6, the attachment of the receptacle conduit 2 via a grommet/conduit assembly 8, FIG. 3 shows a typical manner of decoration suitable for use with a Christmas tree.

Figure 3A:
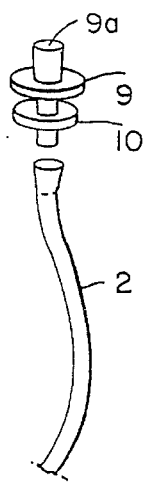
FIG. 3a shows an exploded view of the grommet/connector assembly as one means for attachment of the receptacle conduit to the receptacle body.

FIG. 3a shows an exploded view of the grommet/connector assembly 8 as one means for attachment of the receptacle conduit 2 to the receptacle body 1 at the latter's discharge outlet 4. First, a rubber grommet 9 with an internal opening 9a is inserted in the discharge outlet 4 designed to seal the discharge outlet 4 so that all water is discharged through the grommet internal opening 9a. Next, a plastic connector 10 is employed. The connector 10 is sized such that one end of the connector fits snugly within the grommet opening 9a and the other connector end fits snugly within one opening of the receptacle conduit 2.

Figure 4:
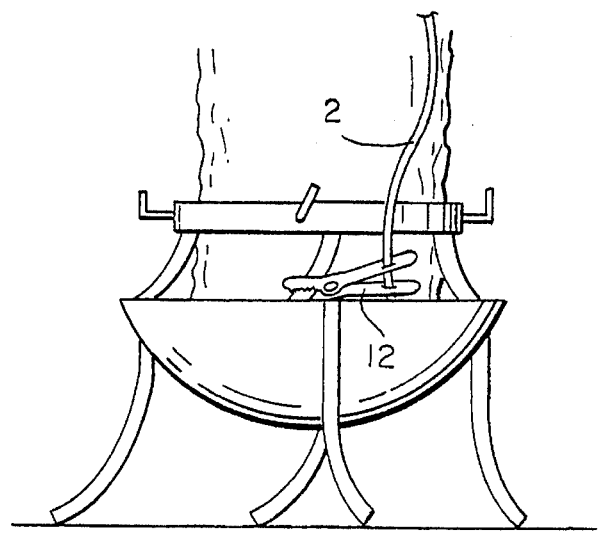
FIG. 4 shows attachment of the terminal end of the conduit to stabilize its position just above the tree stand water reservoir for convenient and efficient delivery thereto of the water introduced into the receptacle body.

The receptacle conduit 2 may be of any suitable construction and size, but it is preferably a flexible plastic hose as typically used as an air hose for an aquarium. The conduit 2 is connected at its upper end at the discharge outlet opening 4 of the receptacle body via grommet/connector assembly 8, and, at its lower (or terminal) end the conduit 2 is positioned to permit the discharge water to flow into the tree stand reservoir. Preferably, a stabilizing means 12 is employed to position the lower end of the conduit to avoid water spills. This could be accomplished by affixing the conduit's lower end to a portion of the tree stand above the reservoir with something as simple as a twisted or something more complicated as a hose guide with clamp attachment means, as shown in FIG. 4.

Figure 3B:
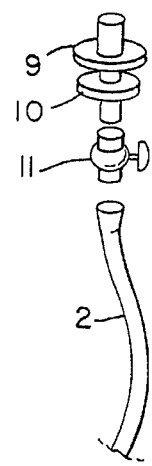
FIG. 3b shows the exploded view of FIG. 3a with the insertion between the receptacle body and the conduit of a flow regulation means in the form of a stopcock as a part of the grommet/connector assembly.

In a preferred embodiment of the invention, there is included a flow regulation means 11 to control the rate at which the discharge water flows from the receptacle body to the tree stand reservoir, via the receptacle conduit 2, and/or to halt said flow to avoid overflowing the reservoir in the event too much refill water is added to the receptacle body 1 or to permit refill water to be temporarily stored in the receptacle body 1 for later addition simply by adjustment of the flow regulation means 11. The flow regulation means 11 may be of several types including, but not limited to, a stopcock, a clamp, or a valve. For example, FIG. 3b depicts the employment of a flow regulation means 11 in the form of a stopcock as a part of the grommet/connector assembly 8 inserted between the plastic connector 10 and the upper end of conduit 2. Alternatively, the plastic connector 10 could be inserted between the grommet 9 and the plastic connector 10 or as a one piece combination wherein the plastic connector 10 is modified internally to include a stopcock, valve, or other flow regulation means 11.

Figure 4A:
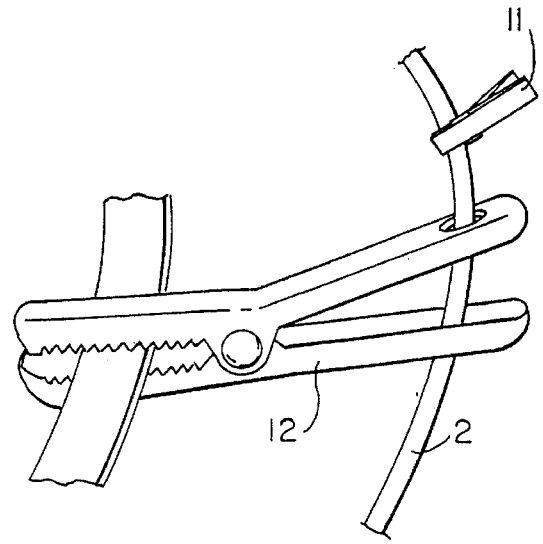
FIG. 4a shows a detailed view of the manner of attachment described in FIG. 4 with the addition of a flow regulation means in the form of a clamp positioned in-line along the conduit.

In a different embodiment for inclusion of a flow regulation means 11, a simple clamp can be employed at any point along the conduit 2 to pinch the conduit to restrict the discharge water flow either partially or completely. Again, the clamp can be as simple as a clothespin or an engineered device with a screw type clamp tension adjustment. Such an embodiment is depicted in FIG. 4a.

Figure 4B:
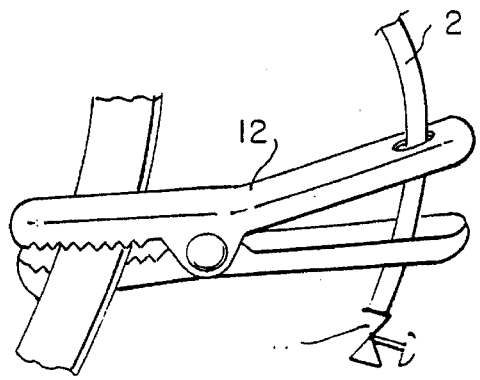
FIG. 4b shows a detailed view of the manner of attachment described in FIG. 4 with the addition of a flow regulation means in the form of a valve positioned at the terminal end of the conduit.

Finally, in a further alternative embodiment of the invention including a flow regulation means 11, a valve may be inserted at any point along the conduit. Preferably, the valve would be located in a position similar to the location of the stopcock shown in FIG. 3b or at a point convenient for access in-line along the conduit 2. Although it may not be the most accessible location, the valve flow regulation means 11 may be located at the lower, or terminal, end of the conduit 2 as depicted in FIG. 4b.

Various modifications and variations will no doubt occur to those skilled in the arts to which the invention device and method pertain. To the extent such variations basically rely on the teachings through which this disclosure has advanced the art they are properly considered to be within the scope of this invention as defined by the appended claims.

What I claim is:

1. A filling apparatus for a fluid reservoir remote from said apparatus comprising (1) a fluid supporting receptacle body with a higher inlet opening and a lower discharge outlet, (2) a gravity discharged guiding conduit for carrying the fluid to the remote fluid reservoir, and (3) a flow regulator located in-line along the guiding conduit for controlling the rate of gravity discharge of the fluid from the fluid supporting receptable body, via the guiding conduit, to the reservoir, wherein the body is a gourd.

2. The apparatus of claim 1 wherein the guiding conduit is a flexible plastic tube.

3. The apparatus of claim 2 wherein the plastic tube is attached to the discharge outlet via a grommet.

4. A method for watering a live tree removed from the ground and held upright in a tree stand including a water reservoir comprising adding water to a fill receptacle supported by a branch of the tree located at a site elevated above and remote from the tree stand reservoir wherein said receptacle is comprised of (1) a gourd-shaped body to support a quantity of water with an inlet opening to receive the water and an outlet opening located lower on the body relative to the location of the inlet opening to permit gravity discharge of the water and (2) a conduit for directing the flow of the discharge water from the body outlet to the reservoir, wherein the gourd-shaped body is a gourd, the conduit is connected to the body via a flow regulator, and the discharged water flow is regulated by a flow rate regulator.

5. The method of claim 4 wherein the conduit is a flexible plastic tube.

6. The method of claim 5 wherein the body is decorated as an ornament.

7. The method of claim 4 wherein the conduit is attached to the discharge outlet of the body via a grommet.

8. A method for watering a live tree removed from the ground and held upright in a tree stand including a water reservoir comprising adding water to a fill receptacle located at a site remote from the tree stand reservoir wherein said receptacle is comprised of (1) a gourd-shaped body to support a quantity of water with an inlet opening to receive the water and an outlet opening located lower on the body relative to the location of the inlet opening to permit gravity discharge of the water and (2) a conduit for directing the flow of the discharge water from the body outlet to the reservoir, wherein the discharged water flow is regulated by a flow rate regulator positioned in-line along the conduit and wherein the body is a gourd.

9. The improved method of claim 8 wherein the fill receptacle is located above the reservoir and is supported by a branch of the tree.

10. The improved method of claim 8 wherein the conduit is a flexible plastic tube.

11. The method of claim 10 wherein the body is decorated as an ornament.

12. The method of claim 8 wherein the conduit is attached to the discharge outlet of the body via a grommet.

13. The method of claim 8 wherein the flow regulator is selected from the group of flow regulators consisting of a stopcock, a valve, and a clamp.

* * * * *